(12) United States Patent
Matsuzaki et al.

(10) Patent No.: US 8,328,259 B2
(45) Date of Patent: Dec. 11, 2012

(54) STRUCTURE FOR FIXING END OF TRIM COVER

(75) Inventors: Tsutomu Matsuzaki, Tochigi (JP); Hiroshi Ohara, Tochigi (JP)

(73) Assignee: TS Tech Co., Ltd., Asaka-shi, Saitama (JP)

( * ) Notice: Subject to any disclaimer, the term of this patent is extended or adjusted under 35 U.S.C. 154(b) by 160 days.

(21) Appl. No.: 12/749,941

(22) Filed: Mar. 30, 2010

(65) Prior Publication Data
US 2010/0242235 A1    Sep. 30, 2010

(30) Foreign Application Priority Data
Mar. 31, 2009   (JP) .................................. 2009-086196

(51) Int. Cl.
*B60J 7/00* (2006.01)
(52) U.S. Cl. ...................................... 296/1.08; 296/39.1
(58) Field of Classification Search ................. 296/1.08, 296/39.1, 63, 146.7
See application file for complete search history.

(56) References Cited

U.S. PATENT DOCUMENTS
7,621,556 B2 *   11/2009   Itakura ........................ 280/728.2

* cited by examiner

*Primary Examiner* — Joseph Pape
(74) *Attorney, Agent, or Firm* — Shoemaker and Mattare

(57) ABSTRACT

A trim cover having overlapped first and second cover members is fixed to a vehicle surface by a structure which includes a belt-like support plate attached along an end of the first cover member, and an engaging element. The engaging element has a longitudinal base portion and spaced tongue-shaped pieces projecting laterally therefrom. The engaging element extends along an end of the second cover member which positionally corresponds to the end of the first cover member. Fasteners fix the support plate, at both ends and a center portion thereof, through the end of the first cover member, to a surface of a vehicle. The tongue-shaped pieces of the engaging element are press-fitted through spaces in regions between the first cover member and the surface which are not occupied by the fasteners.

2 Claims, 2 Drawing Sheets

STRUCTURE FOR FIXING END OF TRIM COVER

BACKGROUND OF THE INVENTION

1. Field of the Invention

The present invention relates to a structure for fixing an end of a trim cover (hereinafter referred to as "a trim cover end-fixing structure"), which can be employed in order to fix the end of the trim cover onto a surface of a vehicle interior equipment such as a vehicle seat or a door trim

2. Description of the Related Art

For example, planar fasteners have been very often used in order to fix trim covers for various uses onto surfaces of seat covers of seats.

In a case where a planer fastener is employed in order to fix a portion of a trim cover onto a portion of a seat cover of a seat, a male member of the planar fastener is previously attached to one of the portions of the trim cover and seat cover, and a female member of the planar fastener is previously attached to the other of the portions of the trim cover and seat cover. The male member and the female member are engaged with each other, to thereby fix the portion of the trim cover onto the portion of the seat cover. In this case, a connection portion between the portions of the trim cover and seat cover which is formed by the engagement between the male and female members becomes thicker. Particularly, in a case where an end of the trim cover is fixed to a portion of the seat cover by means of a planar fastener, a male member of which is previously attached to one of the end of the trim cover and the portion of the seat cover and a female member of which is previously attached to the other of the end of the trim cover and the portion of the seat cover, a connection portion between the end of the trim cover and the portion of the seat cover which is formed by the engagement between the male and female members can be viewed from the outside, so that the visual appearance of the seat is made undesired. Moreover, there is a fear that the male member and the female member are disengaged from each other due to tensioning force which may be applied to the male member and/or the female member in such a direction as to cause them be separated from each other, depending upon an attaching place to which the portion of the trim cover is attached, and uses of the trim cover.

SUMMARY OF THE INVENTION

It is therefore an object of the present invention to provide a trim cover end-fixing structure which allows an end of the trim cover to be treated suitably in a visual appearance, can enhance an attaching strength of the trim cover, and allows the trim cover to be fixed at low cost.

In accordance with the present invention, there is provided a structure for fixing an end of a trim cover, the trim cover including first and second cover members combined with each other in such a manner that surfaces thereof are lapped one over the other. The structure comprises a belt-like support, plate attached along an end of the first cover member, and an engaging element including a longitudinal base portion and a plurality of tongue-shaped pieces provided along the longitudinal base portion so as to be spaced apart from one another and project laterally from the longitudinal base portion. The engaging element is provided along an end of the second cover member, which positionally corresponds to the end of the first cover member when combined with the first cover member, with the longitudinal base portion thereof being attached to the end of the second cover member. The support plate is fixed at both ends thereof and a substantially center portion thereof, through the end of the first cover member, onto a surface of a vehicle interior equipment by fasteners and the tongue-shaped pieces of the engaging element are engagedly press-fitted through spaces which are defined by regions between the first cover member and the surface of the vehicle interior equipment which are not occupied by the fasteners, whereby the ends of the first and second cover members of the trim cover are fixed onto the surface of the vehicle interior equipment with the tongue-shaped pieces being interposedly held between the first cover member and the vehicle interior equipment.

In the trim cover end-fixing structure according to the present invention, a connection portion which is produced by the support plate and the tongue-shaped pieces of the engaging element is made thinner. In addition, in the condition where the tongue-shaped pieces of the engaging element are engagedly press-fitted through the spaces, a portion of the second cover member which is adjacent the engaging element is wound around the end of the first cover member and the support plate and conceals them, so that the end of the trim cover can be treated suitably in a visual appearance. Moreover, the fixing of the end of the trim cover is performed by fixing the support plate of the first cover member to the vehicle interior equipment by the fasteners and then causing the tongue-shaped pieces of the engaging element to be engagedly press-fitted through the spaces, so that an attaching strength of the trim cover can be enhanced. In addition, the fixing of the end of the trim cover is performed by using the support plate, the engaging element, and the fasteners which are all available at low cost, so that the fixing of the end of the trim cover can be performed at low cost.

DETAILED DESCRIPTION OF PREFERRED EMBODIMENTS

A trim cover end-fixing structure according to an embodiment of the present invention will be discussed hereinafter with reference to the accompanying drawings.

There has been proposed a vehicle seat in which, in order that the vehicle seat is prevented from being contacted with a wheel house or any bulged portion of a vehicle body in a vehicle interior, a lower corner portion of a side of a seat back of the vehicle seat and a rear corner portion of a side of a seat cushion of the vehicle seat are formed so as to become oblique surfaces, whereby a space for preventing the vehicle seat from being contacted with the wheel house or the bulged portion of the vehicle body is provided between the oblique surfaces. The illustrated embodiment of the present invention is applied to such a vehicle seat (vehicle interior equipment). More particularly, the embodiment of the present invention is applied to a case where an end of a trim cover is fixed onto a surface of a seat cover of the vehicle seat in order to prevent any objects from falling down through the space between the obliquely formed rear corner portion of the side of the seat cushion and the obliquely formed lower corner portion of the seat back.

The trim cover includes first and second cover members that are formed substantially in the same shape in outline. As will be discussed in greater detail hereinafter, the first and second cover members are combined with each other in such a manner that surfaces thereof are lapped one over the other. Each of the first and second cover members is formed from a sheet of any suitable covering material, such as fabric, synthetic leather, or real leather. The trim cover end-fixing structure includes first and second belt-like support plates and first and second engaging elements.

Figure 1:
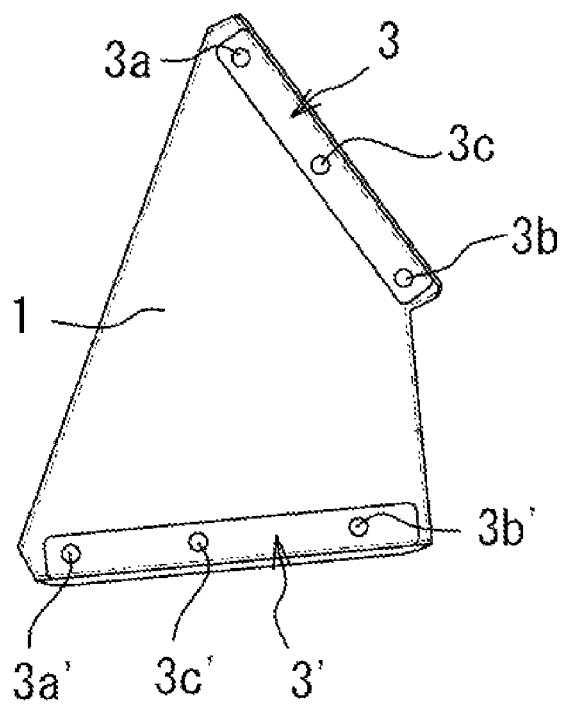
FIG. 1 is an explanatory view illustrating a first cover member to which a trim cover end-fixing structure according to an embodiment of the present invention is applied.

Referring now to FIG. 1, there are illustrated the first cover member 1 and the first and second support plates 3, 3'. In the illustrated example, the first cover member 1 is formed substantially in a trapezoidal-shape in outline. The first support plate 3 is formed with a plurality of insertion holes 3a, 3b, 3c which are spaced apart from one another and disposed at one end of the first support plate 3, at the other end of the first support plate 3, and at a substantially center portion of the first support plate 3, respectively. Similarly, the second support plate 3' is formed with a plurality of insertion holes 3a', 3b', 3c' which are spaced apart from one another and disposed at one end of the second support plate 3', at the other end of the second support plate 3', and at a substantially center portion of the second support plate 3', respectively. As will be discussed in greater detail hereinafter, the first support plate 3 is attached to an upper end of a surface of the first cover member 1 so as to extend along the upper end of the surface of the first cover member 1 and the second support plate 3' is attached to a lower end of the surface of the first cover member 1 so as to extend along the lower end portion of the first cover member 1.

Figure 2:
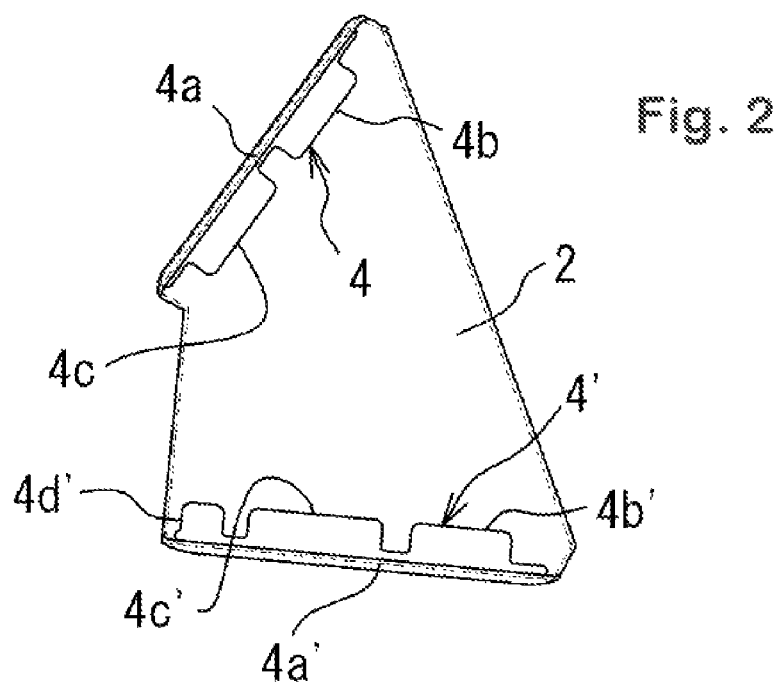
FIG. 2 is an explanatory view illustrating a second cover member to which the trim cover end-fixing structure is applied.

Referring to FIG. 2, there are illustrated the second cover member 2 and the first and second engaging elements 4, 4'. In the illustrated example, the second cover member 2 is formed substantially in a trapezoidal-shape in outline. The first engaging element 4 of the trim cover end-fixing structure includes a longitudinal base portion 4a, and a plurality of tongue-shaped pieces 4b, 4c provided along the longitudinal base portion 4a so as to be spaced apart from each other and project laterally from the longitudinal base portion 4a. Similarly, the second engaging element 4' includes a longitudinal base portion 4a', and a plurality of tongue-shaped pieces 4b', 4c', 4d' provided along the longitudinal base portion 4a' so as to be spaced apart from one another and project laterally from the longitudinal base portion 4a'. As will be discussed in greater detail hereinafter, the first engaging element 4 is attached to an upper end of a surface of the second cover member 2 which faces the surface of the first cover member 1 when the first and second cover members 1, 2 are combined with each other, and the second engaging element 4' is also attached to a lower end of the surface of the second cover member 2. More particularly, the first engaging element 4 is attached to the upper end of the surface of the second cover member 2, which positionally corresponds to the upper end of the surface of the first cover member 1 when combined with the first cover member 1, in such a manner that the longitudinal base portion 4a extends along the upper end portion of the surface of the second cover member 2 and the tongue-shaped pieces 4b, 4c are laid on the surface of the second cover member 2. The second engaging element 4' is attached to the lower end of the surface of the second cover member 2, which positionally corresponds to the lower end of the surface of the first cover member 1 when combined with the first cover member 1, in such a manner that the longitudinal base portion 4a' extends along the lower end of the surface of the second cover member 2 and the tongue-shaped pieces 4b', 4c', 4d' are laid on the surface of the second cover member 2. Each of the first and second engaging elements 4, 4' is formed as a one-piece member comprising the longitudinal base portion and the tongue-shaped pieces.

Each of the first and second support plates 3, 3' and the first and second engaging elements 4, 4' is formed from a resin-made plate which is formed of, for example, polypropylene. The first support plate 3 is attached to the upper end of the surface of the first cover member 1 by sewing a longitudinal edge of the first support plate 3 to the upper end of the surface of the first cover member 1. The second support plate 3' is attached to the lower end of the surface of the first cover member 1 by sewing a longitudinal edge of the second support plate 3' to the lower end of the surface of the first cover member 1. Similarly, the first engaging element 4 is attached to the upper end of the surface of the second cover member 2 by sewing the longitudinal base portion 4a of the first engaging element 4 to the upper end of the surface of the second cover member 2. The second engaging element 4' is attached to the lower end of the second cover member 2 by sewing the longitudinal base portion 4a' of the second engaging element 4' to the lower end of the surface of the second cover member 2. The support plates 3, 3' and the engaging element 4, 4' may be formed from metal-made thin plates that are formed of, for example, stainless steel. In this case, each of the support plates 3, 3' and the engaging elements 4, 4' may be bonded to the upper end or lower end of the corresponding cover member in the same manner as described above.

The first and second cover members 1, 2 are combined with each other by causing the surfaces of the first and second cover members 1, 2 to be lapped one over the other, then sewing together front side edges of the first and second cover members 1, 2, and sewing together rear side edges of the first and second cover member 1, 2, whereby the first and second cover members 1, 2 form the trim cover.

Figure 3:
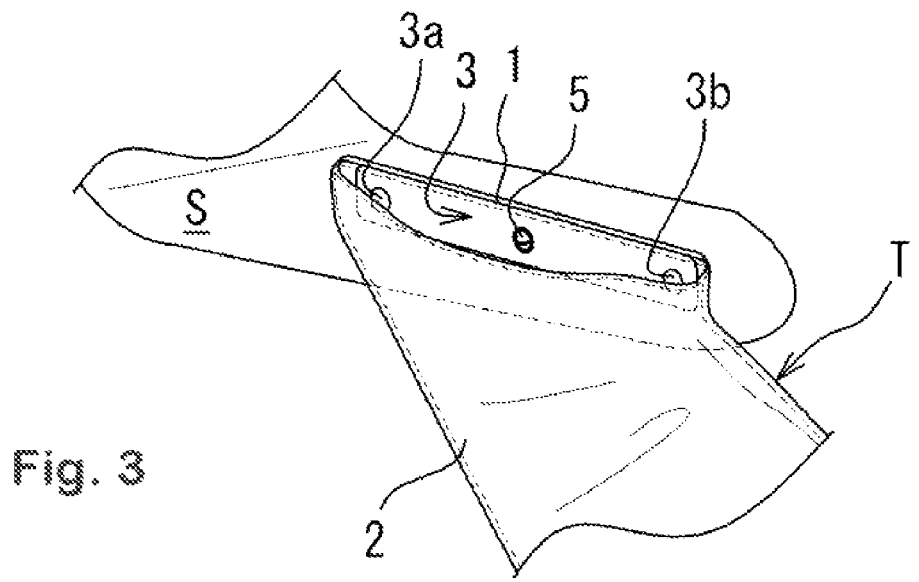
FIGS. 3 and 4 are each an explanatory view that is of assistance in explaining fixing of an end of a trim cover by using the trim cover end-fixing structure.
Figure 4:
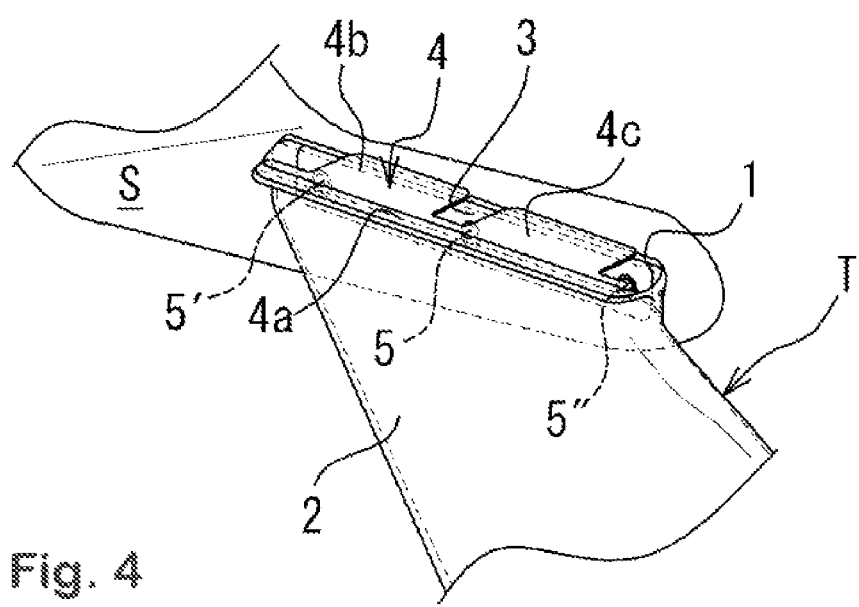

Referring now to FIGS. 3 and 4, fixing of the end of the trim cover will be discussed hereinafter. Incidentally, FIGS. 3 and 4 show only upper end of the trim cover T for the purpose of brevity. First of all, as shown in FIG. 3, the upper end of the first cover member 1 of the trim cover T is fixed to a predetermined portion of the seat cover S of the vehicle seat by applying the first support plate 3 through the upper end of the first cover member 1 against the predetermined portion of the seat cover S, penetrating any suitable fasteners 5, 5', 5", such as screws or rivets, (only one fastener 5 is shown in FIG. 3 but the fasteners 5, 5', 5" are shown in FIG. 4) through the insertion holes 3a, 3c, 3b of the first support plate 3 and the predetermined portion of the seat cover S, and fastening the fasteners 5, 5', 5" to a seat frame of the vehicle seat (not shown). Thus, the upper end of the first cover member 1 is kept applied against the predetermined portion of the seat cover S by the first support plate 3 that is fixed through the upper end of the first cover member 1 and the predetermined portion of the seat cover S to the seat frame by the fasteners 5, 5', 5".

Next, the tongue-shaped pieces 4b, 4c of the first engaging element 4 attached to the upper end of the second cover member 2 are separated from the surface of the second cover member 2 as shown in FIG. 4. In this condition, the tongue-shaped pieces 4b, 4c of the first engaging element 4 are engagedly press-fitted through spaces which are defined by regions between the first cover member 1 and the predetermined portion of the seat cover S which are not occupied by the fasteners 5, 5', 5" penetrating through the first support plate 3, the first cover member 1 and the seat cover S. More particularly, in the condition where the first cover member 1 and the seat cover S are joined together by the fasteners 5, 5', 5" as discussed above, a first space between the adjacent fasteners 5, 5' and a second space between the adjacent fasteners 5, 5" are provided between the other surface of the first cover member 1 which faces the seat cover S, and the seat cover S. In this condition, the tongue-shaped piece 4b and the tongue-shaped piece 4c of the first engaging element 4 are engagedly press-fitted through the first space between the adjacent fasteners 5, 5' and the second space between the adjacent fasteners 5, 5", respectively. Thus, the upper end of the trim cover T is fixed onto the seat cover S. Incidentally, when the tongue-shaped pieces 4b, 4c of the first engaging element 4 are engagedly press-fitted through the first and second spaces, a portion of the second cover member 2 which is adjacent the first engaging element 4 is wound around an upper edge of the first support plate 3 and the upper end of the first cover member 1, so that the first support plate 3 and the upper end of the first cover member 1 can be concealed by the portion of the second cover member 2.

In this embodiment, the tongue-shaped piece 4b and the tongue-shaped pieces 4c of the first engaging element 4 are engagedly press-fitted through the first space between the adjacent fasteners 5, 5' and the second space between the adjacent fasteners 5, 5", respectively, and are interposedly held between the other surface of the first cover member 1 and the seat cover S.

A lower end of the trim cover T is fixed onto a second predetermined portion of the seat cover S in the same manner as the upper end of the trim cover T is fixed onto the seat cover S. More particularly, the lower end of the first cover member 1 of the trim cover T is fixed onto the second predetermined portion of the seat cover S by applying the second support plate 3' through the lower end of the first cover member 1 against the second predetermined portion of the seat cover S, penetrating any suitable second fasteners, such as screws or rivets, through the insertion holes 3a', 3b', 3c' of the second support plate 3' and the second predetermined portion of the seat cover S, and fastening the second fasteners to the seat frame. Thus, the lower end of the first cover member 1 is kept applied against the second predetermined portion of the seat cover S by the second support plate 3' that is fixed through the lower end of the first cover member 1 and the second predetermined portion of the seat cover S to the seat frame by the second fasteners. Next, the tongue-shaped pieces 4b', 4c', 4d' of the second engaging element 4' attached to the lower end of the second cover member 2 are separated from the surface of the second cover member 2 and engagedly press-fitted through spaces which are defined by regions between the first cover member 1 and the seat cover S which are not occupied by the second fasteners penetrating through the second support plate 3', the first cover member 1 and the seat cover S. More particularly, in the condition where the first cover member 1 and the seat cover S are joined together by the second fasteners as discussed above, a first space between the adjacent fasteners penetrating through the insertion holes 3a', 3c' of the second support plate 3', a second space between the adjacent fasteners penetrating through insertion holes 3c', 3b', and a third space occupying a lateral zone of the fastener penetrating through the insertion hole 3b' are provided between the other surface of the first cover member 1 and the seat cover S. In this condition, the tongue-shaped piece 4b', the tongue-shaped piece 4c', and the tongue-shaped piece 4d' of the second engaging element 4 are engagedly press-fitted through the first space, the second space, and the third space, respectively. Thus, the lower end of the trim cover T is fixed onto the seat cover S. Incidentally, when the tongue-shaped pieces 4b', 4c', 4d' of the second engaging element 4' are engagedly press-fitted through the first, second, and third spaces, a second portion of the second cover member 2 which is adjacent the second engaging element 4' is wound around a lower edge of the second support plate 3' and the lower end of the first cover member 1, so that the second support plate 3' and the lower end of the first cover member 1 can be concealed by the second portion of the second cover member 2.

A second embodiment of the trim cover end-fixing structure according to the present invention will be discussed hereinafter. This embodiment is identical to the first embodiment described above except that the first support plate 3 and the second support plates 3' are attached to the other surface of the first cover member 1 which faces the seat cover S when the first cover member 1 of the trim cover T is fixed onto the seat cover S as described above. Therefore, the description of the remaining parts of the second embodiment will not be repeated. In this embodiment, the tongue-shaped pieces 4b, 4c, 4b', 4c', 4d' of the first and second engaging elements 4, 4' of the second cover member 2 are engagedly press-fitted through spaces which are defined by regions between the first support plate 3 and the first predetermined portion of the seat cover S, which are not occupied by the first fasteners, and by regions between the second support plate 3' and the second predetermined portion of the seat cover S which are not occupied by the second fasteners.

In each of the above-mentioned embodiments according to the present invention, a connection portion which is produced by the first support plate 3 and the tongue-shaped pieces 4b, 4c of the first engaging element 4, and a connection portion which is produced by the second support plate 3' and the tongue-shaped pieces 4b', 4c', 4d' of the second engaging element 4' are made thinner. In addition, the upper end of the first cover member 1 and the first support plate 3 are concealed by the first portion of the second cover member 2 which is wound around the upper end of the first cover member 1 and the upper edge of the first support plate 3 as discussed above, and the lower end of the first cover member 1 and the second support plate 3' are concealed by the second portion of the second cover member 2 which is wound around the lower end of the first cover member 1 and the lower edge of the second support plate 3' as discussed above, so that the upper and lower ends of the trim cover T can be treated suitably in a visual appearance. Moreover, the fixing of the upper and lower ends of the trim cover T is performed by fixing the first and second support plates 3, 3' of the first cover member 1 to the seat frame by the fasteners and then causing the tongue-shaped pieces 4b, 4c, 4b', 4c', 4d' of the first and second engaging elements 4, 4' to be engagedly press-fitted through the corresponding spaces described above, so that an attaching strength of the trim cover T can be enhanced. In addition, the fixing of the upper and lower ends of the trim cover T is performed by using the support plates 3, 3', the engaging elements 4, 4', and the fasteners such as screws or rivets which are all available at low cost, so that the fixing of the upper and lower ends of the trim cover T can be performed at low cost.

While the above description is made of the trim cover end-fixing structure that is applied to the case where the end of the trim cover is fixed onto the surface of the seat cover in order to prevent any objects from falling down through the space between the obliquely formed rear corner portion of the side of the seat cushion and the obliquely formed lower corner portion of the seat back, the application of the present invention is not limited to such a trim cover end-fixing structure and the present invention may be applied to trim cover end-fixing structures for various uses. The present invention can be also applied to, for example, a case where a pocket in which any cards or the like are to be inserted is provided at a side of the vehicle seat or provided on a surface of any vehicle interior equipment such as a door trim. Moreover, a length of each of the first and second support plates 3, 3', a length of the longitudinal base portion of each of the first and second engaging elements 4, 4', and the number of the tongue-shaped pieces of the first and second engaging elements 4, 4' can be suitably varied.

The terms and expressions which have been employed herein are used as terms of description and not of limitation. There is no intention in the use of such terms and expressions to exclude any equivalents of the features shown and described, or any portion thereof. It is recognized, however, that various modifications are possible within the scope of the invention claimed.

What is claimed is:

1. A structure for fixing an end of a trim cover, the trim cover including first and second cover members combined with each other in such a manner that surfaces thereof are lapped one over the other, the structure comprising:
   a belt-like support plate attached along an end of the first cover member; and
   an engaging element including a longitudinal base portion and a plurality of tongue-shaped pieces provided along the longitudinal base portion so as to be spaced apart from one another and project laterally from the longitudinal base portion;
   the engaging element being provided along an end of the second cover member which positionally corresponds to the end of the first cover member when combined with the first cover member, with the longitudinal base portion thereof being attached to the end of the second cover member;
   the support plate being fixed at both ends thereof and a substantially center portion thereof, through the end of the first cover member, onto a surface of a vehicle interior equipment by fasteners; and
   the tongue-shaped pieces of the engaging element being engagedly press-fitted through spaces which are defined by regions between the first cover member and the surface of the vehicle interior equipment which are not occupied by the fasteners, whereby the ends of the first and second cover members of the trim cover are fixed onto the surface of the vehicle interior equipment with the tongue-shaped pieces being interposedly held between the first cover member and the vehicle interior equipment.

2. The structure according to claim 1, further comprising:
   a second belt-like support plate attached along a second end of the first cover member which is opposite to the first end of the first cover member; and
   a second engaging element including a second longitudinal base portion and a plurality of second tongue-shaped pieces provided along the second longitudinal base portion so as to be spaced apart from one another and project laterally from the second longitudinal base portion;
   the second engaging element being provided along an end of the second cover member which is opposite to the first end of the second cover member and positionally corresponds to the second end of the first cover member when combined with the first cover member, with the second longitudinal base portion of the second engaging element being attached to the second end of the second cover member;
   the second support plate being fixed at both ends thereof and a substantially center portion thereof, through the second end of the first cover member, onto the surface of the vehicle interior equipment by second fasteners; and
   the second tongue-shaped pieces of the second engaging element being engagedly press-fitted through spaces which are defined by regions between the first cover member and the surface of the vehicle interior equipment which are not occupied by the second fasteners, whereby the second ends of the first and second cover members of the trim cover are fixed onto the surface of the vehicle interior equipment with the second tongue-shaped pieces being interposedly held between the first cover member and the vehicle interior equipment.

* * * * *